United States Patent [19]
Weimer et al.

[11] Patent Number: 5,190,737
[45] Date of Patent: Mar. 2, 1993

[54] HIGH YIELD MANUFACTURING PROCESS FOR SILICON CARBIDE

[75] Inventors: Alan W. Weimer; Raymond P. Roach; John P. Henley, all of Midland, Mich.

[73] Assignee: The Dow Chemical Company, Midland, Mich.

[21] Appl. No.: 693,507

[22] Filed: Apr. 30, 1991

Related U.S. Application Data

[63] Continuation-in-part of PCT/US90/00276, Jan. 11, 1990, which is a continuation-in-part of PCT/US89/00114, Jan. 11, 1989, abandoned.

[51] Int. Cl.$^5$ ............................................. C01B 31/36
[52] U.S. Cl. .................................... 423/345; 501/88
[58] Field of Search ............... 423/345, 346; 501/88, 501/90

[56] References Cited

U.S. PATENT DOCUMENTS

| | | | |
|---|---|---|---|
| 3,271,109 | 9/1966 | Mezey et al. | 423/345 |
| 3,709,981 | 1/1973 | Lee et al. | 423/346 |
| 3,836,356 | 9/1974 | Irani | 75/419 |
| 3,920,446 | 11/1975 | Irani | 75/10.67 |
| 4,162,167 | 6/1979 | Enomoto et al. | 501/90 |
| 4,217,335 | 8/1980 | Sasaki et al. | 423/345 |
| 4,226,841 | 10/1980 | Komeya et al. | 423/345 |
| 4,283,375 | 8/1981 | Horne, Jr. et al. | 423/345 |
| 4,292,276 | 9/1981 | Enomoto et al. | 422/199 |
| 4,410,502 | 10/1983 | Yamaguchi et al. | 423/345 |
| 4,467,042 | 8/1984 | Hatta et al. | 501/88 |
| 4,529,575 | 7/1985 | Enomoto et al. | 423/345 |
| 4,543,240 | 9/1985 | Goldberger | 423/346 |
| 4,690,811 | 9/1987 | Kida et al. | 423/345 |
| 4,702,900 | 10/1987 | Kurachi et al. | 423/345 |
| 4,818,511 | 4/1989 | Nishi et al. | 423/344 |
| 4,839,150 | 6/1989 | Coyle et al. | 423/345 |
| 4,869,886 | 9/1989 | Saiki et al. | 423/346 |
| 5,108,461 | 4/1992 | Ruthner | 23/213 R |

FOREIGN PATENT DOCUMENTS

| | | | |
|---|---|---|---|
| 0000661 | 2/1979 | European Pat. Off. | 423/345 |
| 8900114 | 1/1989 | PCT Int'l Appl. | |
| 9000276 | 1/1990 | PCT Int'l Appl. | |
| 488296 | 2/1937 | United Kingdom | |
| 2162504 | 2/1986 | United Kingdom | |

OTHER PUBLICATIONS

Acta Chemica Scandinavica A 35, Oxidation of Silicon Carbide in Oxygen and in Water Vapour at 1500° C., 1981, pp. 247-254.

Advances in Ceramics, Production of Fine, High-Purity, Beta SiC Powder, 1987, pp. 257-263.

Lee et al., Formation of Silicon Carbide from Rice Hulls, 1975, pp. 195-198.

*Primary Examiner*—Olik Chaudhuri
*Assistant Examiner*—Ken Horton

[57] ABSTRACT

A process for preparing silicon carbide by carbothermal reduction which includes transporting, in a gaseous medium, a particulate reactive mixture of a silica source and a carbon source through a reaction zone. The heating rate of the atmosphere within the reaction zone is such that substantially all of the reactive mixture is heated at a heating rate of at least about 100° C./second until an elevated temperature of at least 1800° C. is reached. Either (1) carbon monoxide is added to the reaction zone or (2) a carbon monoxide level in the reaction is achieved in order to provide at least about 30 mole percent of the gases exiting the reaction zone to achieve a higher yield of silicon carbide.

26 Claims, 2 Drawing Sheets

HIGH YIELD MANUFACTURING PROCESS FOR SILICON CARBIDE

CROSS REFERENCE TO RELATED APPLICATIONS

This is a continuation-in-part of copending International Application Number PCT/US90/00276, filed Jan. 11, 1990, which corresponds to Ser. No. 07/720,759, filed Jun. 28, 1991 and which is a continuation-in-part of International Application Number PCT/US89/00114, filed on Jan. 11, 1989, now abandoned.

TECHNICAL FIELD

The present invention relates to the field of ceramic powders. More particularly, it relates to a process for producing silicon carbide ceramic powders.

BACKGROUND OF THE INVENTION

Silicon carbide is a ceramic material valued mainly for its high resistance to thermal stress and shock and its exceptional corrosion resistance in high-temperature oxidizing environments. It has also found extensive use in the abrasive industry because of its hardness and wear resistance.

A number of methods of manufacturing silicon carbide have been developed. These methods include, for example, the carbothermal reduction of silica in an inert atmosphere in a vertical furnace which is based on a reaction approximating the following stoichiometric equation:

$$SiO_2 + 3\,C \rightarrow SiC + 2\,CO \text{ (gas)} \tag{1}$$

However, it is well-known that the actual reaction mechanism proceeds through the synthesis and subsequent reaction of gaseous silicon monoxide according to the following sequence:

$$SiO_2 + C \rightarrow SiO \text{ (gas)} + CO \text{ (gas)} \tag{2}$$

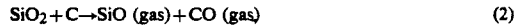

$$SiO \text{ (gas)} + 2\,C \rightarrow SiC + Co \text{ (gas)} \tag{3}$$

A part of the silicon carbide may be formed through a side reaction represented by $$2\,SiO \text{ (gas)} \rightarrow SiO_2 + Si \tag{4}$$

$$Si + C \rightarrow SiC \tag{5}$$

Many of the problems previously encountered with the carbothermal reduction process have been addressed and solved by the process disclosed in commonly-owned PCT Patent Application No. PCT/US90/00276 filed on Jan. 11, 1990, to Weimer, et al. The patent application, which is hereby incorporated by reference was published on Jul. 26, 1990, as a PCT application having International Publication No. WO90/08105. Although the invention disclosed in PCT Patent Application No. PCT/US90/00276 is considered to be an exceptional advance in the field of producing silicon carbide, there remained opportunities to improve the process by improving the conversion rates and by making the process more economical.

It is, therefore, a primary object of the present invention to provide a process for making silicon carbide by carbothermal reduction which has (1) improved conversion rates of forming silicon carbide from carbon and silica sources, and (2) reduced operating costs due to use of less materials and smaller reactors required for the same product yields as the process of aforementioned PCT Patent Application No. PCT/US90/00276.

It is also an object of this invention to provide a process for making sinterable, high quality beta silicon carbide powder of uniform submicron size.

SUMMARY OF THE INVENTION

In accordance with the preferred embodiment of the invention, these and other objects and advantages are addressed as follows. A process is disclosed for preparing silicon carbide by carbothermal reduction, which includes transporting, in a gaseous medium, a particulate reactive mixture of a silica source and a carbon source through a reaction zone. The heating rate of the atmosphere within the reaction zone is such that substantially all of the reactive mixture is heated at a heating rate of at least about 100° C./second until an elevated temperature of at least 1800° C. is reached. Either (1) carbon monoxide is added to the reaction zone, or (2) a carbon monoxide level in the reaction is achieved in order to provide at least about 30 mole percent of the gases exiting in the reaction zone to achieve a higher yield of silicon carbide. The concentration of carbon monoxide increases generally following a path through the reaction tube, and, in most cases the carbon monoxide concentration reaches a maximum at the exit. Generally, measurements of the carbon monoxide flow and concentration take place at the exit. Other measurements may be taken at other locations.

A process for preparing silicon carbide crystals by carbothermal reduction comprises:

(a) transporting a particulate reactive mixture of a silica source and a carbon source in a gaseous medium into a reactor having (1) a reactant transport member, the reactant transport member having a walled chamber defining a hollow conduit, a cooling means for cooling the reactant transport members, and a gas flow space defined by an inner wall having an inner annular space, the inner annular space having an inlet and an exit at the distal end to allow gas to flow therethrough;

(2) a reactor chamber, the reactor chamber having a wall defining a reaction zone, the chamber being in fluid communication with the reactant transport member;

(3) a heating means, the heating means being suitable for heating the particulate reactive mixture in the reaction zone; and (4) a cooling chamber for cooling the reaction product, also used for transporting gases and resultant by-products out of the reactor, the cooling chamber having a wall defining a cooling zone, and a cooling means, the cooling chamber being in fluid communication with the reactor chamber, the temperatures of the reactant transport member, reactor chamber, and cooling chamber being independently controllable such that the particulate reactive mixture can be fed continuously through the reactant transport member into the reaction zone and then into the cooling zone;

(b) adding carbon monoxide gas to the reaction zone while heating the particulate reactive mixture in the reaction zone at a heating rate of at least about 100° C./second until an elevated temperature of at least 1800° C. is reached to form a product; and (c) cooling the product in the cooling zone.

Alternatively, the process may be described in terms that require the carbon monoxide concentration in the reaction zone to be at least about 50 molar percent of the gases present. In this embodiment, the carbon monoxide gas need not be added to the reaction zone from an outside source.

BRIEF DESCRIPTION OF THE DRAWINGS

The nature and extent of the present invention will be clear from the following detailed description of the particular embodiments thereof, taken in conjunction with the appendant drawings, in which.

DETAILED DESCRIPTION OF THE INVENTION

Figure 1:
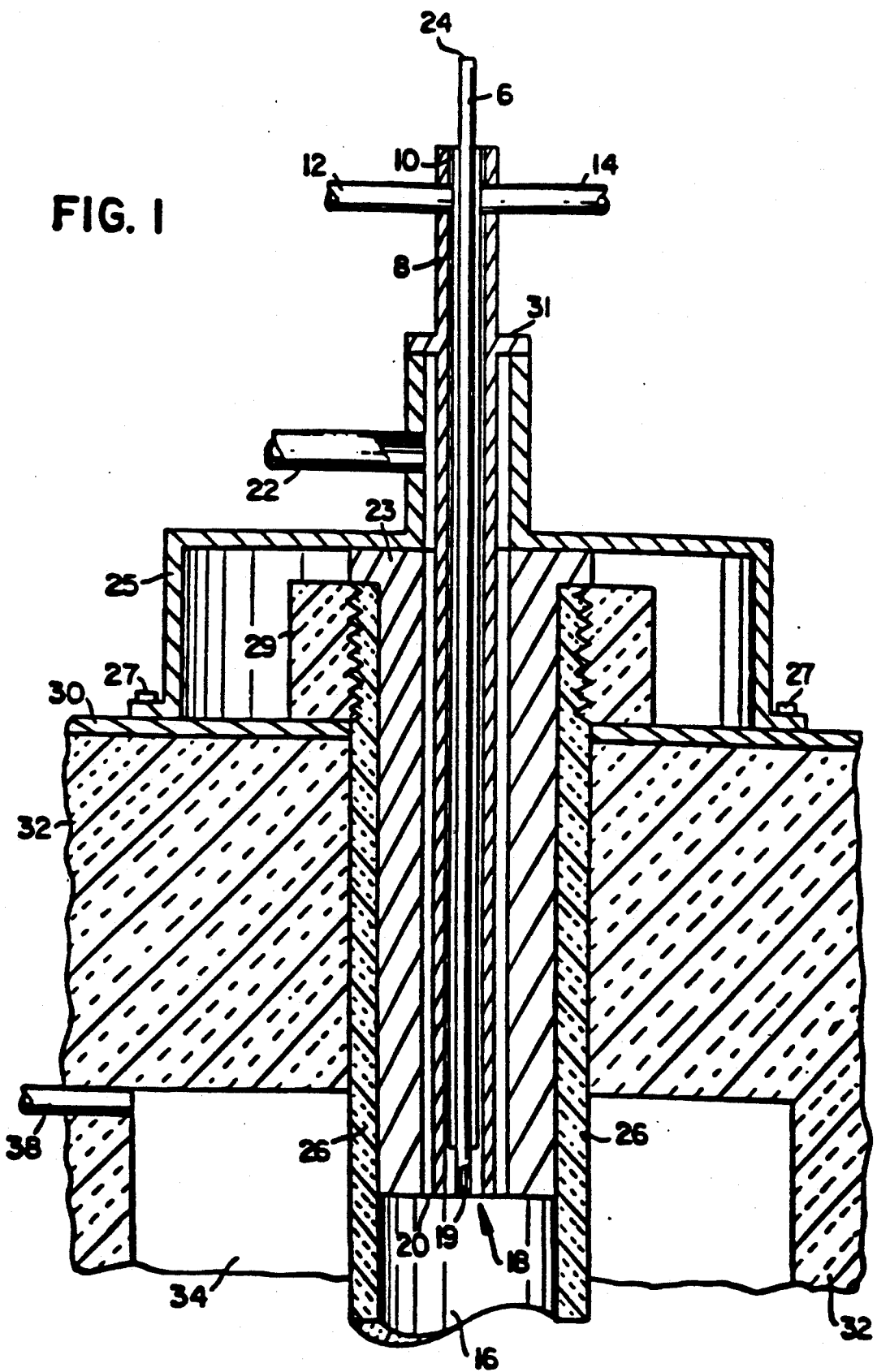
FIG. 1 is a plan view in cross-section of the cooled reactant transport member of the reactor apparatus of FIG. 2.

In general, the present invention is a process by which silicon carbide ceramic crystals can be prepared. The silicon carbide crystals of the present invention are produced by transporting, in a gaseous medium, a particulate reactive mixture of a silica source and a carbon source through a reaction zone such that substantially all of the particles of the reactive mixture are separately and individually heated at a very rapid rate to an elevated temperature of at least 1800° C. in an atmosphere having elevated levels of carbon monoxide. "Substantially all" herein means at least about 75 percent of the particulate reactive mixture, and more preferably at least about 95 weight percent of the particulate reactive mixture. The silicon carbide ceramic powders produced thereby are preferably uniform and substantially pure, as described below.

It was surprisingly discovered that maintaining elevated levels of carbon monoxide gas in the reaction zone atmosphere resulted in higher yields of silicon carbide prepared from carbothermal reduction. It would generally be expected that as the concentration of carbon monoxide increases in the reaction atmosphere, the yield of silicon carbide would decrease due to thermodynamic considerations while considering the overall reaction (1) presented hereinabove. That expectation is supported by the article, "Beta-SiC Powders Produced by Carbothermic Reduction of Silica in a High-Temperature Rotary Furnace" by Wei published in *Communications of the American Ceramic Society*, July 1983, which states "Retention of gaseous SiO and removal of CO gas are required to cause the overall reaction (1) to proceed in the favorable direction with a high yield of the SiC product." By reaction (1), the author is referring to the same reaction (1) provided hereinabove. Additionally, in the article, "Formation of Silicon Carbide from Rice Hulls" published in *Ceramic Bulletin*, Vol. 54, No. 2 (1975), Lee et al. teach using rice hulls which contain silica and cellulose (a carbon source) as raw materials for the formation of SiC. Lee et al. further teach that the SiC yield is inversely proportional to the carbon monoxide concentration at reaction temperatures of from 1290°-1600° C. It was stated that, "When the partial pressure of carbon monoxide was only 0.01 atmospheres, the effect of CO from the reaction was significant enough to decrease the rate . . . the effect of $P_{CO}$ is very significant in suppressing the SiC formation".

According to the process of the present invention, any increase in carbon monoxide concentration, when the other reaction parameters are met as discussed herein, will increase the silicon carbide yield of the reaction. This may be accomplished by adding fresh CO gas, by recycling used CO gas, or by generating carbon monoxide in situ within the reaction zone. Preferably, the carbon monoxide will constitute at least about 15 mole percent of the gases exiting in the reaction zone atmosphere, more preferably, at least about 30 mole percent, even more preferably, at least about 50 mole percent, and, most preferably, about 100 mole percent.

The desired carbon monoxide concentration may also be achieved by generating the carbon monoxide within the reaction zone. When the elevated levels of carbon monoxide are generated within the reaction zone, the generation is at least in part achieved by the carbothermal reduction reaction itself. To increase the level of carbon monoxide produced by the carbothermal reduction reaction, the feed rates of the silica and carbon sources may be increased. Additional carbon monoxide may be generated by adding water into the reaction zone and allowing the water to react with the carbon source to produce carbon monoxide. The water may be added directly to the reaction zone or may be included as part of the particulate reactive mixture. When water is added to the reaction zone and consumes some of the carbon source, it may be desirable to increase the level of carbon source added to compensate for the consumption of the carbon source.

As described briefly above, one general way of achieving an increased carbon monoxide concentration is by adding carbon monoxide from an external supply. In addition, the external supply of the carbon monoxide may be carbon monoxide recycled from the reaction zone or fresh carbon monoxide. When the carbon monoxide is added to the reaction zone, it may constitute all or part of the gaseous medium which transports the particulate reactive mixture. When the carbon monoxide constitutes all or part of the transporting gaseous medium entering the reactor, especially if the carbon monoxide is recycled from the reaction zone, a savings in material cost is realized because less transporting gases are then required. The carbon monoxide level in the reaction zone atmosphere may be achieved by several different methods including generating the carbon monoxide within the reaction zone, a combination of generating the carbon monoxide within the reaction zone and adding carbon monoxide gas to the reaction zone, producing the carbon monoxide solely by carbothermal reduction and a combination of producing the carbon monoxide by carbothermal reduction and by adding water to the reaction zone and allowing the water to react with the carbon source.

In summary, the desired concentration of carbon monoxide in the reaction zone may be achieved by one or a combination of the following:

(a) generating the carbon monoxide in situ by carbothermal reduction;

(b) generating the carbon monoxide by the reaction of water with carbon; or (c) adding fresh or recycled carbon monoxide to the reaction zone.

Of course, at least some of the carbon monoxide present is always sourced from the carbothermal reduction reaction as the reaction inherently produces it.

The starting silica source for the carbothermal reduction reaction is preferably silica, and can be, for example, amorphous granular silica, a fumed silica, "CABOSIL", available from Cabot Corporation, owner of the trademark "CABOSIL", a fine liquid dispersed colloid such as an aqueous colloidal silica, a silica gel, precipitated silica, a mixture thereof, or the like.

The carbon source is desirably selected from the group consisting of various forms of carbon, such as carbon black and acetylene carbon black; a hydrocarbon, defined as a compound containing carbon and hydrogen, including, for example, straight and branched chain alkyl compounds having 1 to 100 carbon atoms and cyclic compounds including alicyclic, aromatic, and heterocyclic compounds; a carbohydrate, including, for example, a complex or simple carbohydrate such as a sugar, for example, sucrose; a starch, for example, cornstarch; or a cellulose; another carbon-containing compound, such as vinylidene chloride polymer and other polymers capable of forming a carbon residue up on thermal decomposition; or a mixture thereof.

Although the carbon sources listed above can be reacted as is, they are preferably calcined, either before or after admixture with the silica source, before the reactive mixture is introduced into the reaction zone. The carbon source is preferably acetylene carbon black or some other form of carbon having a purity, in terms of metals, mean Martin's diameter and particle size distribution, approximating that of acetylene carbon black. The term "Martin's diameter" refers to the distance between opposite sides of an irregular particle, measured crosswise of the particle and on a line bisecting the projected area. The diameters are measured in a direction parallel to the bottom of a transmission electron micrograph (TEM).

All of the above sources are commercially available. Other reactants can also be employed within the scope of the invention.

The carbon and silica starting sources together form a particulate reactive mixture. It is preferred that the silica source and carbon source are finely divided and intimately mixed. "Finely divided" means that it is preferred that the particle size of the particulate reactive mixture is less than about 200 micrometers, more preferably less than about 100 micrometers, and most preferably less than about 50 micrometers. It was found that particle sizes of greater than about 10 micrometers works well in the invention. The degree of uniformity of the particulate reactive mixture generally effects the kinetics of the reaction and therefore the quality of the final product.

It is preferred that the mixture be as intimately mixed as possible, preferably by a method such as by spray drying a very fine dispersion of the silica source and the carbon source. The particulate reactive mixture may be prepared by (a) mixing a silica source and a carbon source together in a liquid medium to form a slurry, (b) removing the liquid medium from the slurry to form a dry mixture, and (c) forming the dry mixture into particles. Physical mixing is also possible, using methods such as, for example, ball milling. It is also possible to use a single source to supply both the silica and the carbon. One such intimate combined carbon and silica source is coked rice hulls.

When a significant amount of water is not added to the reaction zone, it is desirable if the carbon to silica mole ratio of the particulate reactive mixture is less than 3.5, preferably from about 3.0 to less than 3.2, more preferably from about 3.0 to about 3.1, and most preferably about 3.0. This ratio helps to reduce the presence of unreacted carbon in the product, and thus contributes to product purity. However, as mentioned previously herein, if a significant amount of water is added to the reaction zone, it may be desirable to increase the mole ratio of carbon to silica in the particulate reactive mixture to compensate for the consumption of carbon by its reaction to water.

Once the starting materials are combined to form a preferably uniform particulate reactive mixture, the mixture is rapidly reacted at an elevated temperature of at least 1800° C. and for a sufficient time to enable carbothermal reduction. This generally involves heating the reactive mixture in a reaction zone. The rate of heating in part controls the characteristics of the final silicon carbide crystal product. A rapid heating rate is used to instigate a rapid reaction rate. The heating rate is preferably at least about 100° C. per second, more preferably greater than about 500° C. per second, and more preferably still, greater than about 1000° C. per second. The rate is still even more preferably from about 1,000° C. to 100,000° C. per second, and most preferably from about 10,000° C. per second to about 100,000° C. per second. The elevated reaction temperature is desirably greater than about 1800° C., preferably from about 1800° C. to about 2300° C., and more preferably from about 1900° C. to about 2200° C. At these temperatures and heating rates, the silicon carbide tends to be synthesized rapidly. Sufficient time for the reaction is preferably on the order of from about less than two seconds to about 10 seconds, and more typically less than one second. The product can then be cooled to form a product as defined hereinbelow.

The silicon carbide produced hereby preferably tends to be organized more predominantly in its beta-, rather than alpha-, form. This product is usually uniform, having silicon carbide crystals with diameters of less than about 5 micrometers, more preferably less than about 2 micrometers, still more preferably less than about 1 micrometer, and most preferably from about 0.1 micrometer to about 0.4 micrometer. Desirably, at least about 25 percent by weight of the product crystals are less than one micrometer, more desirably at least about 75 percent, and most desirably 100 percent.

The product, after removal of at least a portion of excess carbon and silica, is also preferably at least about 80 percent by weight silicon carbide, more preferably at least about 90 percent by weight, and most preferably at least about 95 percent by weight. Amounts of excess carbon, silica, silicon monoxide, or mixtures thereof, constitute the balance. It is also preferred that the product be stoichiometric silicon carbide. The size distribution of the silicon carbide crystals is preferably such that at least about 50 percent are in the range from about 0.4 times the median crystal size to about 1.6 times the median crystal size. More preferably, at least about 80 percent of the silicon carbide crystals are within this distribution range.

Peter T. B. Shaffer et al., in "Production of Fine, High-Purity, Beta SiC Powder", *Advances in Ceramics*, Vol. 21, pages 257–263 (1987), disclose three post furnace treatments to reduce excess carbon and oxygen contents. The first treatment crushes the crude product and then oxidizes it for a few minutes at 750° C. or below to remove the unreacted carbon. The oxidized SiC powder is then deagglomerated using an attrition mill with steel media and an inert halocarbon. After completing the milling and allowing the halocarbon to evaporate, the resulting powder is washed twice with 10% hydrochloric acid, twice with concentrated hydrofluoric acid to remove residual silica, and once with ethanol before it is dried to yield the final product. The teachings of this reference are incorporated herein by reference.

Hakon Cappelen et al., in "Oxidation of Silicon Carbide in Oxygen and in Water Vapour at 1500° C.", *Acta Chemica Scandinavica A*35, pages 247–254 (1981), suggest that heating in a flowing inert gas enhances removal of surface silica from silicon carbide. The teachings of this reference are incorporated herein by reference.

Four factors have a significant impact upon the mean Martin's diameter, the coefficient of variation and the BET surface area of the resultant silicon carbide crystals. These four factors are: (1) mean Martin's diameter of the starting carbon; (2) purity of the starting carbon; (3) reaction temperature; and (4) reaction time. Other factors, such as mean Martin's diameter of the starting silica, have a much smaller effect upon the resultant silicon carbide crystals.

Control of mean crystal size and size distribution of the resultant silicon carbide crystals is very beneficial. Such control allows one to tailor the green density of a silicon carbide part before it is fired. Since green density influences, in turn, part shrinkage and fired density of the part, such control significantly influences the ability to fabricate quality parts.

The ability to obtain "fine" silicon carbide crystals, e.g., those having a mean Martin's diameter of less than or equal to 0.5 micrometer, without milling, attriting, comminuting or deagglomerating eliminates the inadvertent contamination inherent in such procedures. It also simplifies the procedure. In addition, higher surface areas result in a higher quality, more dense part when these fine silicon carbide crystals are pressureless sintered.

In view of the foregoing, the carbon source is preferably acetylene carbon black or some other form of carbon having a similar purity, particle size and size distribution. For example, it is desirable for the mean Martin's diameter to be less than one micrometer, more preferably within a range of 0.02 to 0.08 micrometers, both ends included, with substantially all of the carbon having a mean Martin's diameter of less than 0.4 micrometer. The reaction temperature is desirably within a range of 1800° C. to 2300° C., preferably 1900° C. to 2200° C., while the reaction time is suitably within a range of 0.2 to ten seconds, preferably within a range of 0.2 to five seconds, and most preferably within a range of 0.2 to three seconds.

By suitable selection of these parameters, silicon carbide crystals prepared in accordance with the present invention have a mean Martin's diameter of less than 0.25 micrometer, and an unmilled BET surface area of less than or equal to 30 m$^2$/g, beneficially less than 18 m$^2$/g, and desirably from 12 to 18 m$^2$/g. The mean Martin's diameter is desirably within a range of 0.06 to 0.18 micrometers, both ends included. Particularly preferred silicon carbide crystals also have a maximum Martin's diameter of 0.5 micrometer.

The silicon carbide product of the present invention can preferably be prepared in a reactor apparatus having a reaction or heating zone and, more preferably, a reactor which also has a cooling zone. One such apparatus is described below with reference to FIGS. 1 and 2. This reactor apparatus is preferably a vertical-type reactor in which starting reactants can be rapidly heated to form a reaction product which is then rapidly cooled and continuously removed therefrom. The reactor's design helps to eliminate problems which can occur near either the inlet or outlet ends. At these locations, silica or silicon monoxide may contact the reactor's internal surfaces. Since the temperature may be cool enough to condense the gaseous silicon monoxide, plugging of the inlets by the condensate can occur.

Figure 2:
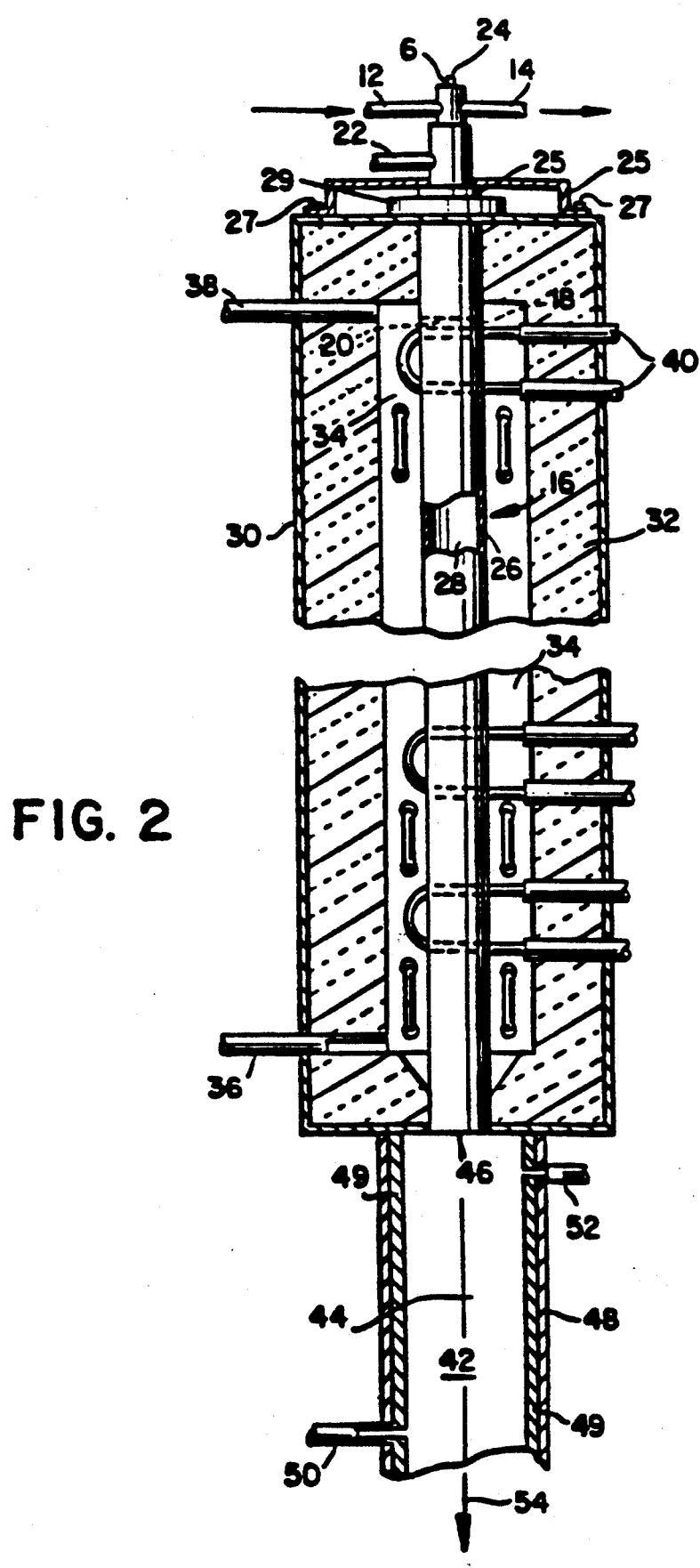
FIG. 2 is a plan view in cross-section of one embodiment of a reactor apparatus by which the present process can be carried out, illustrating with arrows the path of the reactants and product.

A design modification for reducing plugging problems at the inlet end involves a cooled reactant transport member. With combined reference to FIGS. 1 and 2, FIG. 1 shows a more detailed cross-sectional view of the reactor, while FIG. 2 more clearly shows the environment in which the reactor of FIG. 1 is located. Referring especially to FIG. 1 now, the reactor comprises: (a) a reactant transport member 6 having a walled chamber defining a hollow conduit for injecting reactants therethrough having an inlet 24 for receipt of the reactants, and a transport member exit 19, located distal to the inlet opening 24. The transport member is in communication with a reactor chamber 16. Reactant transport member 6 can be cylindrical, rectangular, or of other effective configuration. The transport member is long enough to allow for placement of at least the tip of the transport member exit 19 directly within the reactor chamber 16. Preferably, a short length of the reactant transport member 6 can be placed directly within the reactor chamber 16. The transport member 6 is preferably constructed of copper, which exhibits the desired thermal conductivity. Other conductive materials can also be used.

The reactant transport member 6 is cooled, preferably with cold water flowing through a cooling jacket 8. Jacket 8 is preferably shielded by a baffle 10, with the baffle having a coolant inlet 12 and a coolant outlet 14, to allow coolant to flow through the baffle. Other suitable heat transfer systems can also be used.

In one preferred embodiment of the present invention, there is one cooled reactant transport member 6 in communication with the reactor chamber 16. In another preferred embodiment, there are a plurality of reactant transport members 6 in communication with the reactor chamber 16, to enable uniform, evenly dispersed introduction of feed into the reactor chamber 16.

The reactor further comprises a gas flow space 20, having a concentric inner wall defining an inner annular space. The gas flow space is located proximate the cooling jacket 8 (i.e., outside of the cooling jacket or other heat transfer system). The gas flow space 20 has an inlet and an exit, the exit being located distal to the inlet to allow the flow of gas therethrough. Gas flow space 20 is in communication with the reactor chamber 16. The reactor further comprises a sweep gas inlet 22, which is in fluid communication with the gas flow space 20. The gas flow space is preferably open along its entire lower limit to allow sweep gas to flow through and then exit into the reactor chamber 16. The sweep gas inlet 22 can be constructed such that it is part of a support sleeve 25, having a first end and a second end, wherein the sleeve can be secured to a reactor outer shell 30 by bolts or other fasteners 27 at the first end and which is preferably sealed by gasket or other sealing means 31 at the second end to help to ensure a gas-tight seal. A plug 23, preferably made of graphite, is positioned adjacent to the gas flow space 20 and extends from the top of the support sleeve 25 downwardly to the upper surface 18 of the reactor chamber.

The reactor chamber 16 further comprises a reactor wall 26 which is preferably constructed of graphite. Other refractory materials, such as, for example, other carbonaceous materials, can also be used. The reactor wall 26 is preferably supported by being connected to an internally screw-threaded bushing 29. This wall defines a reaction zone 28, not shown in FIG. 1, but rather as seen in FIG. 2, further down the reactor overall. The reaction zone 28 is in fluid communication with the reactant transport members. Preferably concentric with reactor wall 26 is an outer shell 30. The outer shell 30 serves to shield the environment from the extremely high temperatures, which are above about 1800° C., used in the reaction zone 28. The outer shell 30 preferably encloses a layer 32 of an insulating material, and is cooled using an appropriate means such as a water-cooling system. In one embodiment of the present invention, there is also a gas plenum region 34, disposed between the reactor wall 26 and the outer shell 30. This gas plenum region 34 is also in fluid communication with plenum gas inlet 36 (shown in FIG. 2) and plenum gas outlet 38.

Located proximate to the reactor chamber 16 and its enclosed reaction zone 28 is a heating means 40. In the embodiment of FIG. 2, the heating means 40 is a group of heating elements or electrodes located outside of the reaction zone. The heating means is suitable to heat the reactor wall 26, which can then radiate heat to raise the temperature of the contents of the reaction zone 28 to a desired reaction temperature. The electrodes are preferably graphite and can be disposed vertically or horizontally. They can be of any shape, including, for example, hairpin and linear rod configurations. Direct or inductive heating of the reactor wall 26 by electrical resistance using an appropriate source of electricity is also possible. It is preferred that the heating means be disposed such that, in particular, the area of the reaction zone 28 directly proximate to the reactant transport member 6 can be maintained at a desired reaction temperature. This helps to ensure very rapid radiant heating of the reactants as they pass from the reactant transport member 6 into the reaction zone 28.

At the opposite end of the apparatus from the reactant transport member 6 is a cooling chamber 42, for cooling the reaction product, transporting gasses and resultant by-products. The cooling chamber 42 comprises a cooling zone 44 which is in fluid communication with the reaction zone 28 by means of a cooling inlet 46. The cooling chamber 42 is preferably configured such that its diameter is larger than the diameter of a cooling inlet 46 disposed between the reaction zone 28 and the cooling zone 44. Diameter is defined to mean the greatest distance across a given cross-sectional area, and thus can refer to the greatest distance across a circular or elliptical cross-section, or the diagonal length of a rectangular cross-section. It is preferred that the cooling inlet 46 is of approximately the same diameter as the reaction chamber 16. However, it is also possible for the cooling inlet to be constricted relative to the reaction chamber 16. Where there is no constriction, it is thus inherent that the cooling chamber preferably has a diameter that is larger than the diameter of the reaction chamber 16, and where there is a constriction the cooling chamber 42 preferably has a diameter as defined that is larger than the diameter of the cooling inlet 46.

Like the reactant transport member 6 and the reactor chamber 16, the cooling chamber 42 can be essentially cylindrical, elliptical, rectangular, or of other effective configuration. The cooling chamber is bounded by a wall 48 which allows for maintenance of temperatures below about 350° C., preferably below 100° C. and most preferably below 50° C. in the cooling zone. Thus, the use of an appropriate water-cooling jacket or other cooling system is effective and can be incorporated into the apparatus, or applied externally, as desired, with coolant flowing into coolant area 49 through a coolant inlet 50 and out through a coolant outlet 52. It is also within the scope of the present invention to employ other cooling means known to those skilled in the art, including, for example, cool gas quenching systems. The selected means thus is any means suitable to allow for very rapid cooling of the product powder as it exits from the reaction chamber.

The temperatures of the reactant transport member, the reactor chamber and the cooling chamber are each independently controllable, to allow the particulate reactive mixture to be fed continuously through the reactant transport member, into the reaction zone and into the cooling zone.

Finally, the apparatus of the embodiment of FIG. 2 has an exit 54 at its opposite extreme from the reactant transport member 6. The apparatus exit 54 can preferably be in fluid communication with a collection device (not shown), such as a cyclone or bag filter, in which the final product of the reaction can be collected for further processing as desired.

The method in which the apparatus described above can be used for preparing silicon carbide, including but not limited to the apparatus described in the embodiment illustrated by FIGS. 1 and 2, will be described in detail. The reactants used for illustrative purposes herein will be silica and carbon black.

The particulate reactive mixture of silica and carbon black is preferably first prepared. This reactive mixture can be prepared by physically blending the solid reactants or by other means such as drying a liquid dispersion containing the reactants on the surface of a rotating drum or within a dryer. The reactive mixture particles preferably have a diameter of less than about 150 micrometers, more preferably less than about 100 micrometers, and most preferably less than about 50 micrometers. This is because larger particles or aggregates will tend to fall through the reaction zone having only their surfaces reacted. Milling or grinding of the reactive mixture particles may be necessary in order to achieve desired particle size. The desired particle size can thus be attained with the use of jet mills, ball mills, attrition mills, hammer mills, or any other suitable device. Dispersers such as opposing jets, centrifugal fans and the like can also be employed to break up any agglomerates present in the particulate reactive mixture prior to its introduction into the reaction zone. It is also possible to directly spray dry a liquid dispersion, slurry or gel of the reactants in order to achieve the desired reactive mixture particle size. The dispersion can incorporate water or, in some cases, an appropriate organic material as a solvent. A binder can be included if desired to aid in forming the reactive mixture.

The reactive mixture is preferably introduced using a feeder system that produces as uniform a flow of the mixture as possible. Various applicable feeders, such as twin screw feeders, star valves, slow speed screw feeders, venturi feeders, and the like, as well as modifications thereof, will be known to the skilled artisan. The feeder is desirably a twin screw feeder.

The particulate reactive mixture, preferably silica and carbon, is transported or entrained in a gaseous medium, which can be formed of either an inert gas, such as argon or another noble gas, or a gas which is compatible with the desired reaction, i.e., which either serves as a reactant or is the same as that produced as a reaction by-product. For example, carbon monoxide, argon, helium, nitrogen, hydrogen or mixtures thereof can be used, with carbon monoxide being preferred. The particulate reactive mixture is entrained in the gaseous medium which is flowing at a sufficient rate to disperse any particulate reactive mixture which may have compacted during passage through the feeder system. The particulate reactive mixture is preferably maintained at a temperature of less than or equal to 25° C.

The entrained reactive mixture is then introduced into the reactant transport member 6 via the inlet opening 24. The gaseous medium serves as a carrier to move the reactive mixture through the apparatus. In a preferred embodiment, the apparatus is positioned vertically, with the reactant transport member 6 at the top and the cooling chamber 42 at the bottom. In this orientation gravity also assists in moving the reactive mixture. However, the apparatus can be used in alternative positions, e.g., horizontally, as long as there is sufficient transporting gaseous medium velocity to ensure continuous movement of the reactive mixture through the reactor at a sufficient rate.

At the same time a sweep gas, which is again either an inert gas or a reaction-compatible gas, preferably, carbon monoxide, is passed through gas-flow space 20, where it tends to inhibit contact of any entrained solid, liquid or vapor portions of the reactive mixture with upper reactor chamber surface 18, the surface of plug 23 and any surfaces near the juncture between the reactant transport member outlet 19 and the reaction zone 28. These surfaces may be at a temperature below the reaction temperature, which is at least about 1,800° C. Where silica is used as a reactant, it could result in the formation of gaseous silicon monoxide which, without the gas-flow space, could tend to condense and cause plugging at the cooler sites. This could, in turn, result in the formation of large agglomerated particles which could pass through the reaction zone and, upon collection as product, contain incompletely converted inner cores of reactant. The reactor design described herein circumvents or reduces this problem.

The sweep gas continues out into the reaction zone 28, where it mixes with the transporting gaseous medium reactive mixture. Because of the action of the cooling apparatus or system, such as cooling jacket 8, the temperature in the reactant transport member 6 is preferably less than about 350° C., more preferably less than about 100° C., and most preferably less than about 50° C. Concurrently, a gas is introduced into the gas plenum region 34 exterior of the reactor chamber 16. This gas can preferably be independently selected from the same selection of gases as the sweep gas. For example, in some cases it may be desirable to use nitrogen as the purge gas, whether or not it is also used as the sweep or transporting gas, because of nitrogen's electrical properties. However, in cases where a nitrogen-containing product is unacceptable it would be advisable to ensure that the nitrogen does not have access to the reactor chamber. One way to accomplish this is to maintain the gas in this region at an equilibrium or even negative pressure. This would be particularly advisable because of the porosity of the preferably graphite reactor wall 26, as well as potential leakage around construction joints. In other cases, it may alternatively be desirable to employ a positive gas pressure in gas region 34, to help to prevent escape of transporting or sweep gas and reactant/product particles from the reactor chamber.

There is a significant temperature demarcation between the end of the reactants' pathway through the reactant transport member 6 and the entrance into the reaction zone 28. This temperature demarcation is preferably extremely sharp in relation to the rate of travel of the reactive mixture. The reaction zone temperature is much hotter than the temperature in the reactant transport member 6. As the particles of the silica source and the carbon source enter the hotter reaction zone, they are rapidly heated and reacted.

At the increased temperature of the reaction zone, the reactants or components of the reactive mixture, e.g., silica and carbon, form silicon carbide. Because of the time increment required to ensure complete reaction, preferably from about 0.2 to about 10 seconds, the reaction zone is preferably elongated, and the reactant particle size and constituent intimacy, transporting gas flow rate, length of the reaction zone, and reaction zone temperature are suitable for ensuring completion of the desired reaction.

Having formed the desired product, the reaction product, transporting gas and any product aerosol, i.e., product particles and any volatile materials such as gaseous silicon monoxide and gaseous carbon monoxide, are then introduced directly into the cooling chamber 42, which is described above.

The expanded cooling chamber 42 is preferably maintained at a temperature below about 350° C. to rapidly cool the product. The cooling chamber 42 is more preferably below about 100° C., and most preferably below about 50° C. Upon reaching the cooling zone 44, the reaction is effectively stopped. The preferred expanded configuration, of the cooling chamber as described above, in which the cooling chamber diameter is larger than the diameter of the cooling inlet and, preferably, also larger than the diameter of the reactor or reaction chamber, serves two main purposes. First, it allows for adiabatic cooling, as well as radiative cooling effected by a water jacket or similar cooling means, and thus substantially increases the cooling rate. Second, it helps to eliminate adherence of significant quantities of unreacted liquid reactants, e.g., silicon monoxide, to the walls of the cooling chamber 42, by permitting recrystallization in space prior to wall contact. Plugging problems are thus reduced or eliminated because any unreacted silicon monoxide is discouraged from depositing on the walls of the cooling chamber 42 or at the cooling inlet 46. This helps to ensure continuous operation at this point in the reactor.

Finally, the product can preferably be collected after it has passed through the cooling zone 44. For this purpose, a cyclone or other collection means (not shown), e.g., a filter arrangement of some type, can be used.

The resulting silicon carbide powder preferably shows substantial uniformity of constituent crystal shape and diameter. The powder, particularly after removal of at least a portion of the excess or unreacted carbon and oxygen, preferably includes at least about 25 percent by weight of beta-type silicon carbide crystals, more preferably at least about 75 percent, and most preferably at least about 90 percent. At least about 25 percent, more preferably at least about 75 percent, and most preferably at least about 90 percent of these crystals are preferably in the range of less than about 5 micrometers, more preferably less than about 2 micrometers, and still more preferably less than about 1 micrometer in size. It is still more preferred that at least about 50 percent are in the size range from about 0.1 to about 0.4 micrometers, and it is most preferred that at least about 80 percent are in this size range.

A particularly preferred silicon carbide powder contains, after removal of at least a portion of the excess or unreacted carbon and oxygen, at least 80 weight percent of silicon carbide crystals which have a mean Martin's diameter of less than 0.25 micrometer and a size distribution sufficient to provide a coefficient of variation of 0.6 or less. The term "coefficient of variation" refers to the ratio of a standard deviation to the mean value from which the standard deviation is measured. By way of illustration, a standard deviation of 0.6 and a mean value of 1 provide a coefficient of variation of 0.6. The mean Martin's diameter is most preferably within a range of 0.06 to 0.18 micrometer. The coefficient of variation is most preferably within a range of 0.1 to 0.6.

This final product powder can be made very pure, and is preferably at least about 80 weight percent stoichiometric silicon carbide, more preferably at least about 90 weight percent, and most preferably at least about 95 percent. It may, in some instances, contain small amounts of unreacted carbon, which can be burned out of the product in oxygen, air, steam or carbon dioxide. It may also contain very small amounts of unreacted silica, which can be dissolved with hydrofluoric acid and then removed by washing. The procedures for these after treatments are described hereinabove.

Densification methods, known to those skilled in the art, can be used to densify or consolidate the ceramic powders of one embodiment of the present invention to form the densified parts of another embodiment. The uniformity of crystal size and configuration attainable through preparing silicon carbide powder by the method of the present invention can enable production of a fine-grained product of theoretical or near-theoretical density with minimal void spaces. The void spaces can have a detrimental effect on various physical properties of the densified products, such as strength. Because extensive milling operations of the powder prior to densification are not needed, substantial cost and time reductions can be achieved. The purity level of the powder as produced, e.g., without milling, also reduces potential degradation of properties caused by significant impurity levels.

In addition to manipulation of reactants to achieve the desired product size or configuration, it is also possible to adjust other reaction variables. These variables include (1) the temperatures of the reactant transport member, reaction zone, and cooling zone; (2) the flow rate of the sweep and transporting gases and therefore of the reactants; (3) the reaction zone cross-sectional dimension or dimensions and length; (4) the relationship of the diameters of the cooling chamber and the cooling inlet; and (5) the temperature of sweep, transporting and by-product gases within the reaction chamber. The quantity of by-product gases generated in the reaction should, in come cases, be taken into account in making these adjustments, since it will affect flow rates. For most reactions, the residence time is preferably from about 0.2 to about 10 seconds, but longer or shorter times can also be employed.

Thus, there is provided in accordance with the invention, an improved process for making silicon carbide by carbothermal reduction which (1) has higher conversion rates of forming silicon carbide and is more economical than prior methods and (2) is capable of producing sinterable, high quality beta silicon carbide powder of uniform submicron size.

The following examples are given to more fully illustrate the present invention. However, these examples are intended to be, and should be construed as being, illustrative only and should not limit the scope of the invention.

EXAMPLE 1

Feed Preparation 2.9 lb of "TRITON" X-100 dispersant, an alkyl phenoxy polyethoxy ethanol, available from Rohm Haas Co., owner of the trademark, "TRITON", was added to 288 lb of deionized water and stirred at high shear speed for 10 minutes. 25 lb of acetylene carbon black was slowly added to the water/dispersant solution under constant agitation to form a slurry. Sufficient "DOW CORNING" Antifoam 1410, available from Dow Corning Corp., Midland, Mich., was added to prevent foaming of the slurry. After carbon addition was completed, 95.6 lb of a 39.7 wt % 20 nm $SiO_2$ ammonia-stabilized colloidal silica sol, "NYACOL" 2040NH$_4$, was added to the slurry. "NYACOL" 2040NH$_4$ is available from PQ Corp., Ashland, Mass., owner of the trademark, "NYACOL".

The slurry was fed to an 8 foot diameter spray dryer operating with an overhead rotary atomizer and exit gas temperature of 140° C. Spray-dried powder was collected from the dryer chamber and downstream cyclone and loaded into stainless steel pans, placed into a drying oven and dried for 6 hours at 400° C. with flowing nitrogen gas to remove any chemically-bound water associated with the colloidal silica. The carbon content of the spray-dried and dehydrated $C/SiO_2$ powder was analyzed by combustion analysis to be 38.14 wt % C, indicating a slight excess of carbon above stoichiometric requirements for the carbothermal reduction reaction:

$$3C + SiO_2 \rightarrow SiC + 2CO.$$

Reaction

The $C/SiO_2$ particulate reactive mixture was loaded into a hopper and purged with argon gas. The reaction zone of a 6" I.D. by 11 foot graphite transport reactor described hereinabove with respect to FIGS. 1 and 2 was brought to a temperature of 1950° C. as measured by optical pyrometers viewing the wall of the reactor chamber. Argon gas flowed into the top of the reactor at a total rate of approximately 4 SCFM (3 SCFM as transporting gas and 1 SCFM as sweep gas).

In Example 1A, the $C/SiO_2$ reactive mixture was fed into the graphite transport reactor at the controlled rate of 0.4 lb/min via a twin screw loss-in-weight solids feeder. A gas turbine meter at the exit of the process measured the total gas flow before and during the reaction. Measuring by difference, the measured steady state flow of carbon monoxide generated during reaction was 2.96 SCFM indicating about a 42.5 molar % carbon monoxide concentration within the reaction zone and a partial pressure of carbon monoxide during operation of 2.6 inches of water (total pressure including argon was 6.1 inches of water). The average residence time of particulate within the reaction zone was approximately 2.3 seconds. Powder was collected after reaching steady state via an in-line sampling device below the cooling zone of the reactor. The powder was analyzed chemically to be 36.47 wt % total carbon and 11.52 wt % oxygen (as unreacted $SiO_2$). Silica conversion was calculated to be approximately 80.5% based upon the initial $SiO_2$ available for reaction.

In Example 1B, the $C/SiO_2$ particulate reactive mixture was fed into the graphite transport reactor at the controlled rate of 0.6 lb/min via a twin screw loss-in-weight solids feeder. A gas turbine meter at the exit of the process measured the total gas flow before and during reaction. By difference, the measured steady state flow of carbon monoxide generated during the reaction was 4.51 SCFM indicating about a 53.0 molar % carbon monoxide concentration within the reaction zone and a partial pressure of carbon monoxide during operation of 4.0 inches of water (total reaction zone pressure including argon was 7.6 inches of water). The average residence time of the particulate within the reaction zone was approximately 1.9 seconds. Powder was collected via an in-line sampling device below the cooling zone of the reactor and analyzed chemically to be 33.32 wt % total carbon and 10.0 wt % oxygen (as unreacted silica). Silica conversion was calculated to be approximately 84.4% for the initial silica available for reaction.

EXAMPLE 2

Feed Preparation

Feed was prepared in a manner similar to Example 1. The carbon content of the spray-dried and dehydrated $C/SiO_2$ reactive mixture was analyzed to be 38.91 wt % total carbon indicating a slight excess of carbon above stoichiometric requirements for the carbothermal reduction reaction.

Reaction

The process of Example 1 was repeated except for the differences discussed below and the fact that the temperature of the reaction zone was elevated to 2050° C.

In Example 2A, the $C/SiO_2$ particulate reactive mixture was fed into the graphite transport reactor at the controlled rate of 0.6 lb/min via a twin screw loss-in-weight solids feeder. A gas turbine meter at the exit of the process measured the total gas flow before and during the reaction. By difference, the measured steady state flow of carbon monoxide generated during the reaction was 4.42 SCFM indicating about a 52.5 molar % carbon monoxide concentration within the reaction zone and a partial pressure of carbon monoxide during operation of 1.6 inches of water (total reaction zone pressure including argon was 3.1 inches of water). The average residence time of particulate within the reaction zone was approximately 1.8 seconds. Powder was collected after reaching steady state via an in-line sampling device below the cooling zone of the reactor. The powder was analyzed chemically to be 31.00 wt % total carbon and 3.27 wt % oxygen (as unreacted silica). Silica conversion was calculated to be approximately 95.6% based upon the initial silica available for reaction.

In Example 2B, the $C/SiO_2$ particulate reactive mixture was fed into the graphite transport reactor at the controlled rate of 0.8 lb/min via a twin screw loss-in-weight solids feeder. A gas turbine meter at the exit of the process measured the total gas flow before and during the reaction. By difference, the measured steady state flow of carbon monoxide generated during the reaction was 6.0 SCFM indicating about a 60.0 molar % carbon monoxide concentration within the reaction zone and a partial pressure of carbon monoxide during operation of 2.4 inches of water (total reaction zone pressure including argon was 4.0 inches of water). The average residence time of particulate within the reaction zone was approximately 1.5 seconds. Powder was collected after reaching steady state via an in-line sampling device below the cooling zone of the reactor. The powder was analyzed chemically to be 29.21 wt % total carbon and 3.23 wt % oxygen (as unreacted silica). Silica conversion was calculated to be approximately 95.8% based upon the initial silica available for reaction.

In Example 2C, the $C/SiO_2$ particulate reactive mixture was fed into the graphite transport reactor at the controlled rate of 1.0 lb/min via a twin screw loss-in-weight solids feeder. A gas turbine meter at the exit of the process measured the total gas flow before and during the reaction. By difference, the measured steady state flow of carbon monoxide generated during the reaction was 7.2 SCFM indicating about a 64.3 molar % carbon monoxide concentration within the reaction zone and a partial pressure of carbon monoxide during operation of 2.9 inches of water (total reaction zone pressure including argon was 4.5 inches of water). The average residence time of particulate within the reaction zone was approximately 1.4 seconds. Powder was collected after reaching steady state via an in-line sampling device below the cooling zone of the reactor. The powder was analyzed chemically to be 30.23 wt % total carbon and 3.07 wt % oxygen (as unreacted silica). Silica conversion was calculated to be approximately 96.0% based upon the initial silica available for reaction.

EXAMPLE 3

Feed Preparation

In a first drum, 1.6 liters of "TRITON" X-100 dispersant and 227 ml of ammonium hydroxide were added to 188 lb of deionized water and stirred with high shear for 10 minutes. 127 lb of "CANCARB THERMAX" carbon black, available from R. T. Vanderbilt, Inc. of Norwalk, Conn., owner of the trademark THERMAX, was slowly added to the water/dispersant solution under constant agitation to form a slurry. Sufficient "DOW CORNING" Antifoam 1410 was added to prevent foaming of the slurry. The slurry was mixed with high shear until no visible agglomerates remained.

In a second drum, 132 ml of ammonium hydroxide and 208 ml of "DARVAN" C dispersant, an ammonium polymethacrylate aqueous solution, available from R. T. Vanderbilt, Inc., owner of the trademark "DARVAN", were mixed with 108 lb of deionized water under constant agitation. 167 lb of "MINUSIL"-5 silica was added slowly during high shear mixing to form a slurry. "MINUSIL"-5 silica is a product consisting of 99.3 weight % natural crystalline silica having a mean particle size of 1.1 micron, available from U.S. Silica, Pittsburgh, Pa., owner of the trademark "MINUSIL".

57 lb of "NYACOL" 2040NH₄ was added to the slurry. The slurry was mixed with high shear until no visible agglomerates remained.

The silica slurry of the second drum was mixed with the carbon slurry of the first drum and the slurry mix was agitated for 30 minutes.

The slurry mix was fed to an 8' diameter spray dryer operating with an overhead rotary atomizer and exit gas temperature of 140° C. Spray-dried powder was collected from the dryer chamber and downstream cyclone and loaded into stainless steel pans, placed into a drying oven and dried for 6 hours at 400° C. with flowing nitrogen gas to remove any chemically-bound water associated with the colloidal silica. The carbon content of the spray-dried and dehydrated $C/SiO_2$ powder was analyzed by combustion analysis to be 36.41 wt % carbon indicating a slight deficiency of carbon below stoichiometric requirements for the carbothermal reduction reaction.

Reaction

For Examples 3A-3C, the process of Example 1 was repeated except for the differences discussed below. In Example 3A, the $C/SiO_2$ particulate reactive mixture was fed into the graphite transport reactor at the controlled rate of 0.2 lb/min via a twin screw loss-in-weight solids feeder. The reaction zone was maintained at an operating temperature of 2300° C. A gas turbine meter at the exit of the process measured the total gas flow before and during the reaction. By difference, the measured steady state flow of carbon monoxide generated during the reaction was 1.42 SCFM, indicating about a 26.2 molar % carbon monoxide concentration within the reaction zone and a partial pressure of carbon monoxide during operation of 1.1 inches of water (total reaction zone pressure including argon was 4.3 inches of water). The average residence time of particulate within the reaction zone was approximately 2.6 seconds. Powder was collected after reaching steady state via an in-line sampling device below the cooling zone of the reactor. The powder was analyzed chemically to be 30.29 wt % total carbon and 6.18 wt % oxygen (as unreacted silica). Silica conversion was calculated to be approximately 91.4% based upon the initial silica available for reaction.

In Example 3B, the $C/SiO_2$ particulate reactive mixture was fed into the graphite transport reactor at the controlled rate of 0.4 lb/min via a twin screw loss-in-weight solids feeder. The reaction zone was maintained at an operating temperature of 2200C. A gas turbine meter at the exit of the process measured the total gas flow before and during the reaction. By difference, the measured steady state flow of carbon monoxide generated during the reaction was 2.97 SCFM, indicating about a 42.6 molar % carbon monoxide concentration within the reaction zone and a partial pressure of carbon monoxide during operation of 2.3 inches of water (total reaction zone pressure including argon was 5.4 inches of water). The average residence time of particulate within the reaction zone was approximately 2.1 seconds. Powder was collected after reaching steady state via an in-line sampling device below the cooling zone of the reactor. The powder was analyzed chemically to be 31.62 wt % total carbon and 5.29 wt % oxygen (as unreacted silica). Silica conversion was calculated to be approximately 92.6% based upon the initial silica available for reaction.

In Example 3C, the $C/SiO_2$ particulate reactive mixture was fed into the graphite transport reactor at the controlled rate of 0.6 lb/min via a twin screw loss-in-weight solids feeder. The reaction zone was maintained at an operating temperature of 2200 C. A gas turbine meter at the exit of the process measured the total gas flow before and during the reaction. By difference, the measured steady state flow of carbon monoxide generated during the reaction was 4.35 SCFM, indicating about 52.1 molar % carbon monoxide concentration within the reaction zone and a partial pressure of carbon monoxide during operation of 3.4 inches of water (total reaction zone pressure including argon was 6.5 inches of water). The average residence time of particulate within the reaction zone was approximately 1.7 seconds. Powder was collected after reaching steady state via an in-line sampling device below the cooling zone of the reactor. The powder was analyzed chemically to be 33.27 wt % total carbon and 5.23 wt % oxygen (as unreacted silica). Silica conversion was calculated to be approximately 92.5% based upon the initial silica available for reaction.

EXAMPLE 4

Feed Preparation

Feed was prepared in a manner similar to Example 1. The carbon content of the spray-dried and dehydrated $C/SiO_2$ particulate reactive mixture was analyzed to be 39.23 wt % total carbon indicating a slight excess of carbon above stoichiometric requirements for the carbothermal reduction reaction.

The $C/SiO_2$ particulate reactive mixture was loaded into a hopper and purged with either argon or carbon monoxide gas. The reaction zone of a $6'' \times 11'$ graphite transport reactor described hereinabove with respect to FIGS. 1 and 2 was brought to a temperature of 2050° C. as measured by optical pyrometers viewing the wall of the reactor chamber.

In Example 4A, argon purged the feed hopper and flowed into the top of the reactor at the total rate of approximately 4 SCFM (3 SCFM as transporting and 1 SCFM as sweep gas). The $C/SiO_2$ particulate reactive mixture controlled rate of 0.4 lb/minute via a twin screw loss-in-weight feeder. A gas turbine meter at the exit of the process measured the total gas flow before and during the reaction. By difference, the measured steady state flow of carbon monoxide generated during the reaction was 3.1 SCFM, indicating about a 43.7 molar % carbon monoxide concentration within the reaction zone and a partial pressure of carbon monoxide during operation of 1.5 inches of water (total reaction zone pressure including argon was 3.4 inches of water). The average residence time of particulate within the reaction zone was approximately 2.2 seconds. Powder was collected after reaching steady state via an in-line sampling device below the cooling zone of the reactor. The powder was analyzed chemically to be 36.18 wt % total carbon and 9.52 wt % oxygen (as unreacted silica). Silica conversion was calculated to be approximately 84.6 wt % based upon the initial silica available for reaction.

In Example 4B, carbon monoxide gas purged the feed hopper and flowed into the top of the reactor as transporting gas at the total rate of approximately 3.5 SCFM. The particulate reactive mixture was fed into the graphite transport reactor at the controlled rate of 0.4 lb/minute via a twin screw loss-in-weight feeder. A gas turbine meter at the exit of the process measured the total gas flow before and during the reaction. By difference, the measured steady state flow of carbon monoxide generated during reaction was 3.2 SCFM indicating about a 100 molar % carbon monoxide concentration within the reaction zone and a pressure of carbon monoxide during operation of 3.5 inches of water. The average residence time of particulate within the reaction zone was approximately 2.5 seconds. Powder was collected after reaching steady state via an in-line sampling device below the cooling zone of the reactor. The powder was analyzed chemically to be 37.19 wt % total carbon and 6.69 wt % oxygen (as unreacted silica). Silica conversion was calculated to be approximately 89.5 wt % based upon the initial silica available for reaction.

EXAMPLE 5

Feed Preparation

In a first drum, 1.8 liters of "TRITON" X-100 dispersant and 450 ml of ammonium hydroxide were added to 288 lb of deionized water and stirred with high shear for 10 minutes. 25 lb of acetylene carbon black was slowly added to the water/dispersant solution under constant agitation to form a slurry. Sufficient "DOW CORNING" Antifoam 1410 was added to prevent foaming of the slurry. The slurry was mixed with high shear until no visible agglomerates remained.

In a second drum, 30 ml of ammonium hydroxide and 46 ml of "DARVAN" C dispersant were mixed with 44 lb of deionized water under constant agitation. 37 lb of "MINUSIL"-5 high purity, fine silica were added slowly during high shear mixing to form a slurry. 13 lb of "NYACOL" 2040N$_4$ was added to the slurry. The slurry was mixed with high shear until no visible agglomerates remained.

The silica slurry of the second drum was mixed with the carbon slurry of the first drum and the slurry mix was agitated for 30 minutes.

The slurry mix was fed to an 8' diameter spray dryer operating with an overhead rotary atomizer and exit gas temperature of 140° C. Spray-dried powder was collected from the dryer chamber and downstream cyclone and loaded into stainless steel pans, placed into a drying oven and dried for 6 hours at 400° C. with flowing nitrogen gas to remove any chemically-bound water associated with the colloidal silica. The carbon content of the spray-dried and dehydrated C/SiO$_2$ particulate reactive mixture was analyzed by combustion analysis to be 38.95 wt % carbon indicating a slight excess of carbon above stoichiometric requirements for the carbothermal reduction reaction.

Reaction

The C/SiO$_2$ particulate reactive mixture was loaded into a hopper and purged with either argon or carbon monoxide gas. The reaction zone of a 6"×11' graphite transport reactor described hereinbefore in reference to FIGS. 1 and 2 was brought to a temperature of 2100° C. as measured by optical pyrometers viewing the wall of the reactor chamber.

In Example 5A, argon gas purged the feed hopper and flowed into the top of the reactor at the total rate of approximately 4 SCFM (3 SCFM as transporting and 1 SCFM as sweep gas). The C/SiO$_2$ particulate reactive mixture was fed into the graphite transport reactor at the controlled rate of 0.6 lb/minute via a twin screw loss-in-weight feeder. A gas turbine meter at the exit of the process measured the total gas flow before and during the reaction. By difference, the measured steady state flow of carbon monoxide generated during reaction was 3.7 SCFM, indicating about a 48.1 molar % carbon monoxide concentration within the reaction zone and a partial pressure of carbon monoxide during operation of 1.9 inches of water (total reaction zone pressure including argon was 4.0 inches of water). The average residence time of particulate within the reaction zone was approximately 2.0 seconds. Powder was collected after reaching steady state via an in-line sampling device below the cooling zone of the reactor. The powder was analyzed chemically to be 36.17 wt % total carbon and 6.14 wt % oxygen (as unreacted silica). Silica conversion was calculated to be approximately 90.6 wt % based upon the initial silica available for reaction.

In Example 5B, carbon monoxide gas purged the feed hopper and flowed into the top of the reactor as transporting gas at the total rate of approximately 2.9 SCFM. The C/SiO$_2$ particulate reactive mixture was fed into the graphite transport reactor at the controlled rate of 0.6 lb/minute via a twin screw loss-in-weight feeder. A gas turbine meter at the exit of the process measured the total gas flow before and during the reaction. By difference, the measured steady state flow of carbon monoxide generated during the reaction was 4.1 SCFM indicating about a 100 molar % carbon monoxide concentration within the reaction zone and a pressure of carbon monoxide during operation of 3.3 inches of water. The average residence time of within the reaction zone was approximately 2.0 seconds. Powder was collected after reaching steady state via an in-line sampling device below the cooling zone of the reactor. The powder was analyzed chemically to be 38.49 wt % total carbon and 3.93 wt % oxygen (as unreacted silica). Silica conversion was calculated to be approximately 94.0 wt % based upon the initial silica available for reaction.

SUMMARY OF EXAMPLES

Table 1 provides a summary of the examples, giving the feed rate, the carbon monoxide concentration in the reaction zone, and the silica conversion for each example. As can be seen by the examples, as the concentration of carbon monoxide in the reaction zone was increased, the conversion of silicon carbide increased. Therefore, the objects of the invention have been met by improving the conversion rate of forming silicon carbide from carbon and silica sources at reduced operating costs due to the use of less materials.

TABLE 1

| Example | Solids Feed Rate (lb/min) | [CO] (Mole %) | Silica Conversion (%) |
|---------|---------------------------|---------------|----------------------|
| 1A | 0.4 | 42.5 | 80.5 |
| 1B | 0.6 | 53.0 | 84.4 |
| 2A | 0.6 | 52.5 | 95.6 |
| 2B | 0.8 | 60.0 | 95.8 |
| 2C | 1.0 | 64.3 | 96.0 |
| 3A | 0.2 | 26.2 | 91.4 |
| 3B | 0.4 | 42.6 | 92.6 |
| 3C | 0.6 | 52.1 | 92.5 |
| 4A | 0.4 | 43.7 | 84.6 |
| 4B | 0.4 | 100.0 | 89.5 |
| 5A | 0.6 | 48.1 | 90.6 |
| 5B | 0.6 | 100.0 | 94.0 |

While our invention has been described in terms of a few specific embodiments, it will be appreciated that other embodiments could readily be adapted by one skilled in the art. Accordingly, the scope of our invention is to be considered limited only by the following claims.

We claim:

1. A process for preparing silicon carbide by carbothermal reduction, comprising transporting, in a gaseous medium, a particulate reactive mixture of a silica source and a carbon source through a reaction zone while adding carbon monoxide gas to the reaction zone at a rate such that carbon monoxide gas constitutes at least about 30 mole % of the gases exiting the reaction zone, the heating rate of the atmosphere within the reaction zone being such that substantially all of the reactive mixture is heated at a heating rate of at least about 100° C./second until an elevated temperature of at least 1800° C. is reached.

2. A process of claim 1, wherein carbon monoxide gas is added at a rate such that carbon monoxide gas constitutes at least about 50 mole % of the gases exiting the reaction zone.

3. The process of claim 1, wherein carbon monoxide gas is added at a rate such that carbon monoxide gas constitutes about 100 mole % of the gases exiting the reaction zone.

4. The process of claim 1, wherein the added carbon monoxide gas is at least partially supplied from recycling carbon monoxide gas from the reaction zone.

5. The process of claim 1, wherein the heating rate is from about 100) C./second to about 100,000) C./second.

6. The process of claim 1, wherein the elevated temperature from about 1800° C. to about 2300° C. is reached.

7. The process of claim 1, wherein the elevated temperature from about 1900° C. to about 2200° C. is reached.

8. The process of claim 1, wherein the elevated temperature is maintained for a time period from about 0.2 to about 10 seconds.

9. The process of claim 1, wherein the elevated temperature is maintained for a time period from about 0.2 to about 5 seconds.

10. The process of claim 1, wherein the particulate reactive mixture is prepared by:
   (a) mixing a silica source and a carbon source together in a liquid medium to form a slurry;
   (b) removing the liquid medium from the slurry to form a dry mixture; and
   (c) forming the dry mixture into particles.

11. A process for preparing silicon carbide crystals by carbothermal reduction, comprising:
   (a) transporting a particulate reactive mixture of a silica source and a carbon source in a gaseous medium into a reactor, said reactor having
      (1) a reactant transport member, the reactant transport member having a walled chamber defining a hollow conduit, a cooling means for cooling the reactant transport member, and a gas flow space defined by an inner wall having an inner annular space, the inner annular space having an inlet and an exit at the distal end to allow gas to flow therethrough;
      (2) a reactor chamber, the reactor chamber having a wall defining a reaction zone, the chamber being in fluid communication with the reactant transport member;
      (3) a heating means, the heating means being suitable for heating the particulate reactive mixture in the reaction zone; and
      (4) a cooling chamber for cooling the reaction product, and transporting gases and resultant by-products, the cooling chamber having a wall defining a cooling zone and a cooling means, the cooling chamber being in fluid communication with the reactor chamber;
      the temperatures of the reactant transport member, reactor chamber, and cooling chamber being independently controllable such that the particulate reactive mixture can be fed continuously through the reactant transport member into the reaction zone and then into the cooling zone;
   (b) adding carbon monoxide gas to the reaction zone at a rate such that carbon monoxide gas constitutes at least about 30 mole % of the gases exiting the reaction zone while heating the particulate reactive mixture in the reaction zone at a heating rate of at least about 100° C./second until an elevated temperature of at least 1800° C. is reached to form a product; and
   (c) cooling the product in the cooling zone.

12. The process of claim 11, wherein fluid communication between the reactor chamber and the cooling chamber is accomplished by means of a cooling inlet, the cooling chamber being configured such that its diameter is larger than the diameter of the cooling inlet.

13. A process for preparing silicon carbide by carbothermal reduction, comprising transporting, in a gaseous medium, a particulate reactive mixture of a silica source and a carbon source through a reaction zone in which carbon monoxide constitutes at least about 30 mole percent of the gases exiting the reaction zone, the heating rate of the atmosphere within the reaction zone being such that substantially all of the reactive mixture is heated at a rate of at least about 100° C./second until an elevated temperature of at least 1800° C. is reached.

14. The process of claim 13, wherein the carbon monoxide level constitutes at least about 50 mole percent of the gases exiting the reaction zone.

15. The process of claim 13, wherein the carbon monoxide level constitutes about 100 mole percent of the gases exiting the reaction zone.

16. The process of claim 13, wherein the carbon monoxide level exiting the reaction zone is at least partially achieved by recycling carbon monoxide gas from the reaction zone.

17. The process of claim 13, wherein the heating rate is from about 100° C./second to about 100,000° C./second.

18. The process of claim 13, wherein the elevated temperature from about 1800° C. to about 2300° C. is reached.

19. The process of claim 13, wherein the elevated temperature from about 1900° C. to about 2200° C. is reached.

20. The process of claim 13, wherein the elevated temperature is maintained for a time period from about 0.2 to about 10 seconds.

21. The process of claim 13, wherein the elevated temperature is maintained for a time period from about 0.2 to about 5 seconds.

22. The process of claim 13, wherein the particulate reactive mixture is prepared by:
   (a) mixing a silica source and a carbon source together in a liquid medium to form a slurry;

(b) removing the liquid medium from the slurry to form a dry mixture; and (c) forming the dry mixture into particles.

23. The process of claim 13, wherein the carbon monoxide level exiting the reaction zone is achieved by a method selected from the group consisting of (a) generating the carbon monoxide within the reaction zone and (b) a combination of generating the carbon monoxide within the reaction zone and adding carbon monoxide gas to the reaction zone.

24. The process of claim 13, wherein generating the carbon monoxide within the reaction zone is achieved by a method selected from the group consisting of:

(a) producing the carbon monoxide solely by carbothermal reduction; and (b) a combination of producing the carbon monoxide by carbothermal reduction and by adding water to the reaction zone and allowing the water to react with the carbon source.

25. A process for preparing silicon carbide crystals by carbothermal reduction, comprising:

(a) transporting a particulate reactive mixture of a silica source and a carbon source in a gaseous medium into a reactor, said reactor having (1) a reactant transport member, the reactant transport member having a walled chamber defining a hollow conduit, a cooling means for cooling the transport member, and a gas flow space defined by an inner wall having an inner annular space, the inner annular space having an inlet at a proximal end and an exit at the distal end to allow gas to be flowed therethrough;

(2) a reactor chamber, the reactor chamber having a wall defining a reaction zone, the reaction zone having a carbon monoxide level which constitutes at least about 30 mole percent of the gases exiting the reaction zone, the chamber being in fluid communication with the reactant transport member;

(3) a heating means, the heating means being suitable for heating the particulate reactive mixture in the reaction zone; and (4) a cooling chamber, for cooling the reaction product, transporting gases and resultant by-product, the cooling chamber having a wall defining a chamber being in fluid communication with the reactor chamber, the temperature of the reactant transport member, reactor chamber, and cooling chamber being independently controllable such that the particulate reactive mixture can be fed continuously through the reactant transport member into the reaction zone and then into the cooling zone;

(b) heating the particulate reactive mixture in the reaction zone at a heating rate of at least about 100° C./second until an elevated temperature of at least 1800° C. is reached to form a product; and (c) cooling the product in the cooling zone.

26. The process of claim 25, wherein fluid communication between the reactor chamber and the cooling chamber is accomplished by means of a cooling inlet, the cooling chamber being configured such that its diameter is larger than the diameter of the cooling inlet.

* * * * *